United States Patent
Yang

(12) 
(10) Patent No.: US 6,172,995 B1
(45) Date of Patent: Jan. 9, 2001

(54) HIGH POWER BROADBAND SOURCE WITH STABLE AND EQUALIZED SPECTRUM OUTPUT

(75) Inventor: Dan Dan Yang, Gatineau (CA)

(73) Assignee: JDS Uniphase Inc., Nepean (CA)

(*) Notice: Under 35 U.S.C. 154(b), the term of this patent shall be extended for 0 days.

(21) Appl. No.: 08/914,163

(22) Filed: Aug. 19, 1997

(30) Foreign Application Priority Data

Mar. 18, 1997 (CA) .................................................. 2200269

(51) Int. Cl.$^7$ ....................................................... H01S 3/30
(52) U.S. Cl. ................................................. 372/6; 372/102
(58) Field of Search ........................................ 372/6

(56) References Cited

U.S. PATENT DOCUMENTS 5,239,607 * 8/1993 da Silva et al. .................. 372/6

* cited by examiner

Primary Examiner—Leon Scott, Jr.
(74) Attorney, Agent, or Firm—Neil Teitelbaum

(57) ABSTRACT

A broadband light source is fabricated from an optical transmission medium having an amplification material such as rare earth doped (e.g. erbium) fiber. The natural emission spectrum of this amplification material is corrected. The weak emission wavelength region has been enhanced and the whole spectrum flattened. The source outputs high power with about 25% pump efficiency. The spectrum is stable and the power density is equalized through out the emission region.

19 Claims, 4 Drawing Sheets

HIGH POWER BROADBAND SOURCE WITH STABLE AND EQUALIZED SPECTRUM OUTPUT

FIELD OF THE INVENTION

This invention is in the field of fiber optics, particularly in the field of optical amplifiers.

BACKGROUND TO THE INVENTION

Optical amplifiers, especially erbium doped fiber amplifiers (EDFAs), are largely used in the optical communication systems for increasing the signal transmission distance. It is well known that optical amplifiers, fiber or semiconductor based, with or without the presence of an input signal, emit a fluorescent light called Amplified Spontaneous Emission (ASE). This ASE is of low temporal coherence, and emits within a wide wavelength range.

In the case of an erbium doped fiber amplifier, ASE has a peak around 1530 nm, then the power density decreases, having a dip around 1542 nm, increases slightly again and reaches a plateau centered around 1550 nm. The spectrum has a 3-dB bandwidth of about 9 nm. The density difference between the peak at 1530 nm and the plateau around 1550 nm is about 15 dB. The spectrum is not flat.

A much wider 3-dB bandwidth and a flat spectrum output would be of great use for passive component testing, spectroscopy, fiber sensor, fiber gyroscopes, optical coherence tomography etc., for replacement of existing tunable lasers, for much lower cost and for much faster and easier testing results, especially for passive component manufacturers. Combined with a scanning filter, it would be able to provide a true continuously tunable light source without any frequency steps, which is critical for material structure analysis. However, the existing narrow 3 dB bandwidth is not sufficient for these applications.

SUMMARY OF THE INVENTION

The present invention provides a high power broadband optical source having a high long-term stability and a 3-dB bandwidth of more than 33 nm. It offers a high output power with a pumping efficiency of greater than 25%. Thus the signal produced using the apparatus of the present invention can be used to for the aforenoted applications.

In accordance with an embodiment of this invention, an optical amplifier medium is used as a fluorescent light emitting material. In the case of erbium fiber, the gain medium is pumped by a 980 nm or a 1480 nm laser diode. Amplified Spontaneous Emission (ASE) is generated and propagates in two directions: one is forward propagating ASE (i.e., in the same direction of transmission signal when it's used as an amplifier), the other one is backward propagating ASE (i.e., reversibly propagating compared to the usual signal direction). The natural ASE spectrum of the erbium fiber has huge power density difference between the section around 1530 nm and that around 1550 nm; usually it is about 15 dB or higher.

The amplification medium, in our case the erbium doped fiber has two sections. The first one, pumped by a small portion of the pump power (30% in a successful laboratory prototype), is used to generate a seed stage. The backward propagating ASE is used as a seed signal and is sent back into the gain medium through a 50% bi-directional coupler. Along with a fiber Bragg grating having characteristics as described below and positioned at the end of the seed stage, it provides a strong and broadband spectrum without the huge peak at 1530 nm.

The second stage, pumped by 70% of the pump power, comprises an amplification stage. When the back-feed seed signal enters into this stage, with a power of several mW, the gain medium is forced to work in deep saturation and thus emits a strong and equalized power density at each wavelength within the erbium emission window. The low plateau section of the ASE spectrum is enhanced. It gives a flat spectrum within 1.5 dB peak to peak difference. The 3-dB bandwidth becomes about 33 nm instead of 9 nm. The self-saturation results also in a much higher pump efficiency, 25 mW out of 100 mW pumping power, compared to a pure ASE source which has only about 10% pumping efficiency.

In accordance with an embodiment of the invention, a broadband optical source comprises (a) a first stage amplifier for producing an amplified spontaneous emission (ASE) optical seed signal having a forward propagating signal and a backward propagating optical signal, (b) feedback apparatus for feeding back the backward propagating signal to the first stage amplifier to generate a forward propagating broadband optical signal, (c) a filter for receiving the broadband optical signal, the filter having a transfer characteristic inverse to at least a portion of the broadband optical signal for flattening the broadband optical signal, (d) a second stage amplifier for amplifying the flattened broadband optical signal, and (e) apparatus for outputting the flattened broadband optical signal.

In accordance with another embodiment, a method of producing a broadband optical signal comprises (a) pumping a first stage amplifier with an optical pumping signal, to produce an amplified spontaneous emission (ASE) seed signal having a forward propagating optical signal and a backward propagating optical signal, (b) feeding back the backward propagating optical signal to the first stage amplifier to generate a forward propagating broadband optical signal, (c) passing the broadband signal through a filter having a transfer characteristic which is inverse to at least a portion of the broadband optical signal to flatten the broadband signal, and (d) amplifying and outputting the flattened broadband signal.

In accordance with another embodiment, a method of producing a broadband optical signal comprises generating an amplified spontaneous emission (ASE) signal in an optical amplifier having forward propagating and backward propagating portions thereof, feeding back the backward propagating portion to the optical amplifier to saturate it, and outputting a broadband optical signal from the optical amplifier.

BRIEF INTRODUCTION TO THE DRAWINGS

A better understanding of the invention will be obtained by considering the detailed description below, with reference to the following drawings, in which.

DETAILED DESCRIPTION OF EMBODIMENTS OF THE INVENTION

In general, a two stage, bi-directional pumping configuration is used. Input pump power is split into 30% and 70% by a TAP coupler 3. ASE is generated and propagates in two directions, backward propagating and forward propagating. In order to correct the natural ASE spectrum, (a) backward propagating ASE is coupled back into an Erbium doped fiber by using a 50% bi-directional coupler, a coupler which could give the maximum feedback. The most important thing is have an adequate power feed-back, strong enough to saturate the second amplification stage but not too strong resulting in the 1530 nm region being completely suppressed.

2. a fiber Bragg grating is fabricated to have a transmission spectrum which is inverse (as identical as possible) to the ASE peak. The grating is set at the end of the seed stage in order to have a seed signal with a higher 1550 nm plateau portion. An isolator is used in front of the grating to dump an undesired 1530 nm ASE peak.

Figure 5:
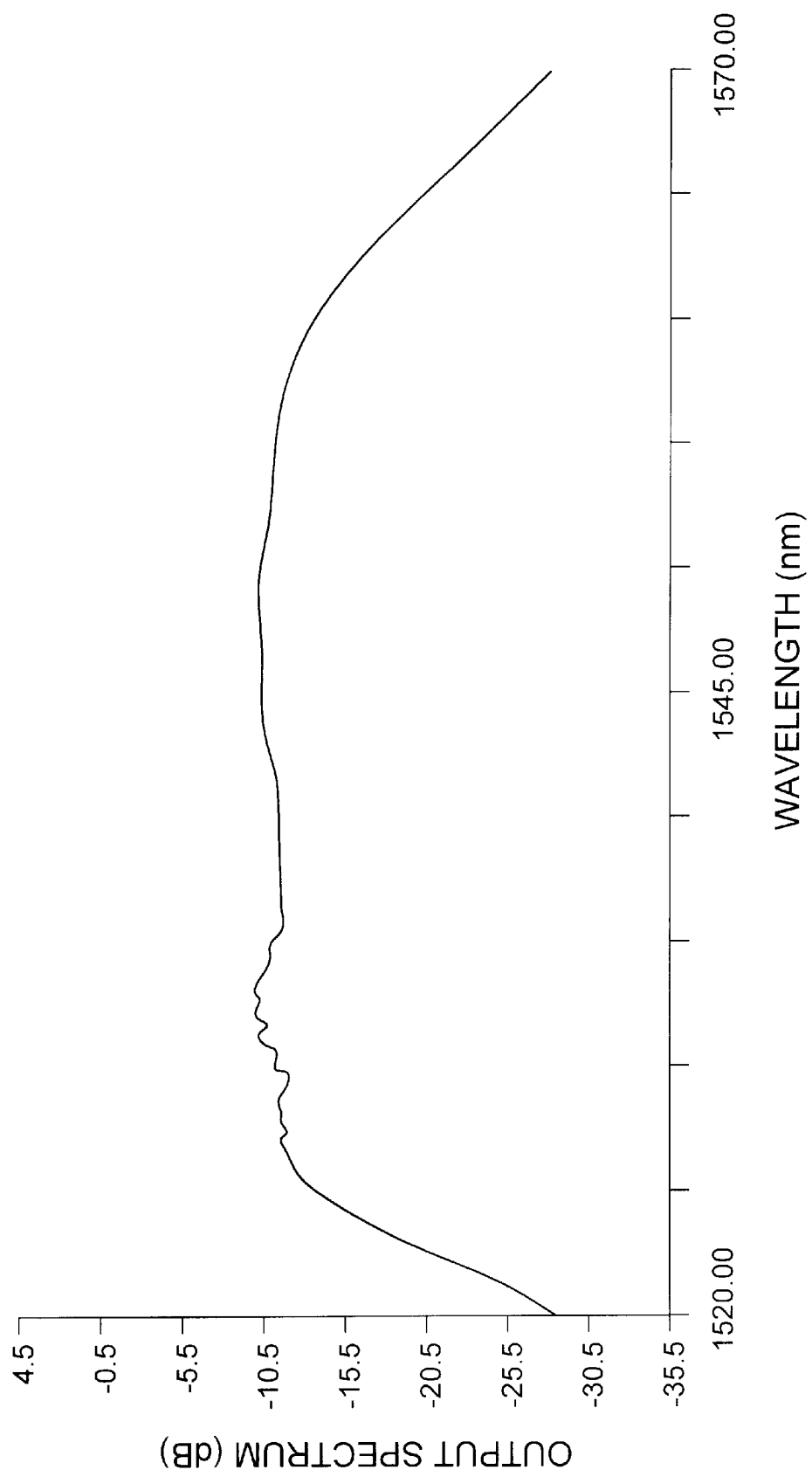
FIG. 5 illustrates the light source output spectrum.

After an optimization of each erbium fiber length, the spectrum output is shown by FIG. 5. Due to the presence of seed signal, the amplification medium (the erbium fiber) works in saturation and thus provides a long term stability. The saturation allows also a high pump efficiency resulting an output of about 25 mW with only 100 mW pump power. The power density now is equalized so the 3-dB bandwidth represents the entire erbium fiber emission window, which is about 33 to 35 nm.

Figure 1:
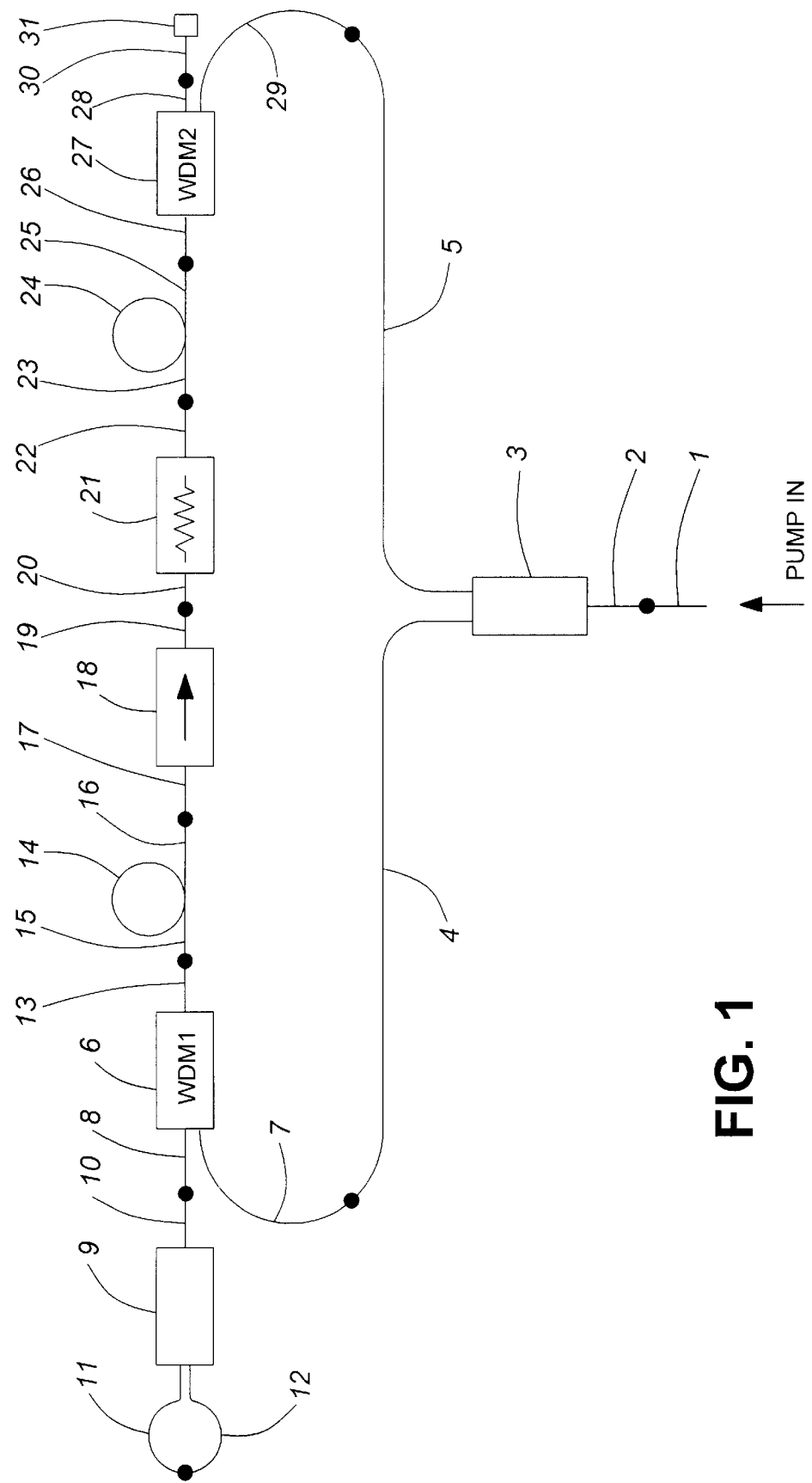
FIG. 1 is a schematic of a structure for implementing the invention.

Referring to FIG. 1, two correction steps are implemented using the principles of the invention. Pump light is sent into the structure through fiber pigtail 1. This is fusion spliced with the input port 2 of a fiber splitter 3 for the pumping wavelength. One of the output ports of the splitter 4 is connected by fusion with the pump laser input port 7 of a wavelength division multiplexer for 980/1550 nm 6. The other input port 8 of this WDM 980/1550 multiplexer 6 is connected with the input/output port 10 of a 50% coupler 9. The two ports 11 and 12 on the other side are fused together to get the backward propagating ASE coming back into the system.

The output port 13 of multiplexer 6 is spliced with one end 15 of the first stage amplifier 14. The length of this fiber in the case of a successful laboratory prototype was 12 m. The length can vary depending on the fiber dopant concentration and needs to be optimized. The other end 16 of the amplifier is connected with the input port 17 of a single stage isolator 18. This isolator is selected to have a peak isolation around 1530 nm. The output port 19 of this isolator is coupled to the input port 20 of the fiber Bragg grating 21. The output port 22 of the grating connects to the second stage amplifier 24 through a fusion splice to the one end 23. The other end 25 is coupled to the second WDM980/1550 nm. wave division multiplexer 27 input port 26. The other input port 29 is connected with the 70% output port 5 of the splitter 3. The output port 28 is fused with a FC/PC connector (31) through pigtail (30) to provide an output signal.

The second stage amplifier fiber 24 length was 12 m in a successful laboratory prototype but may also vary according to the fiber dopant concentration as well as the pumping wavelength. However this length is less critical than the first stage 14 fiber length.

Figure 2:
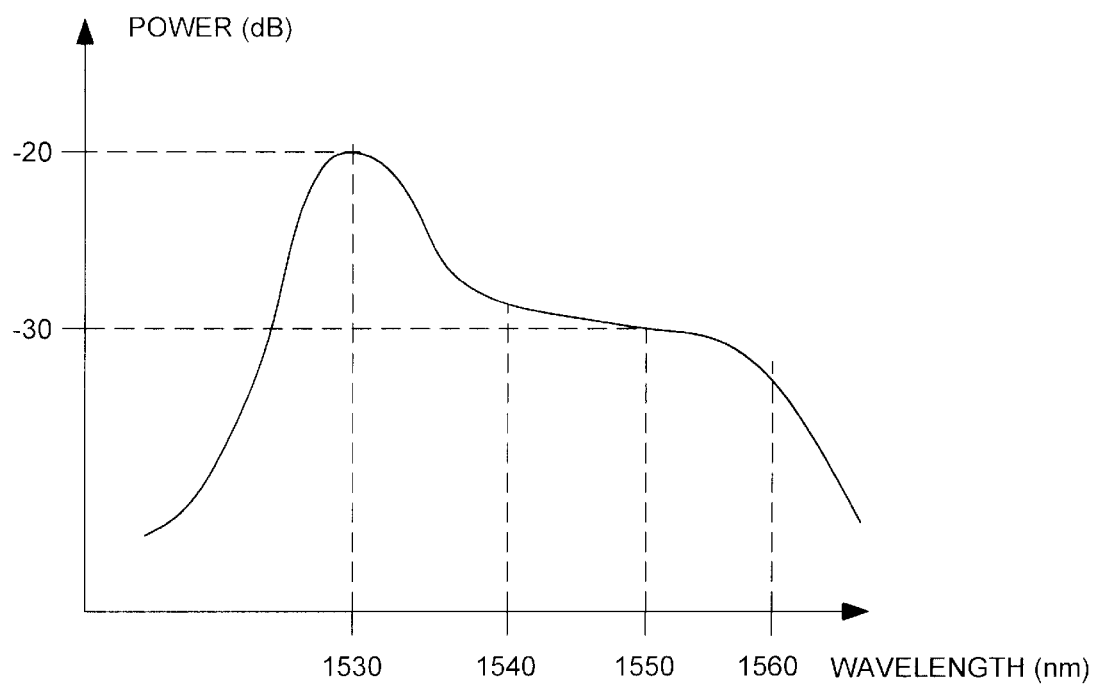
FIG. 2 shows a natural ASE spectrum.
Figure 3:
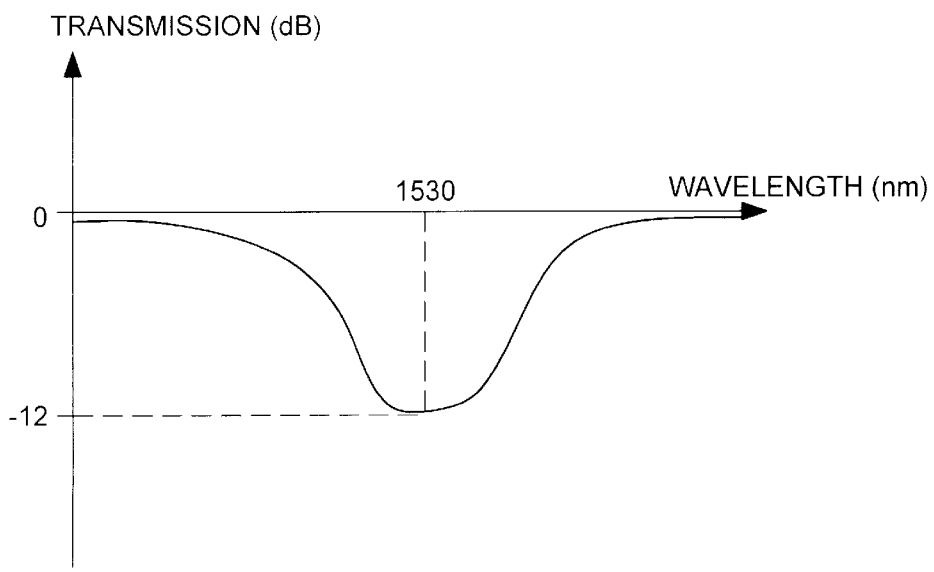
FIG. 3 shows a Bragg grating transmission spectrum in accordance with an embodiment of the invention.
Figure 4:
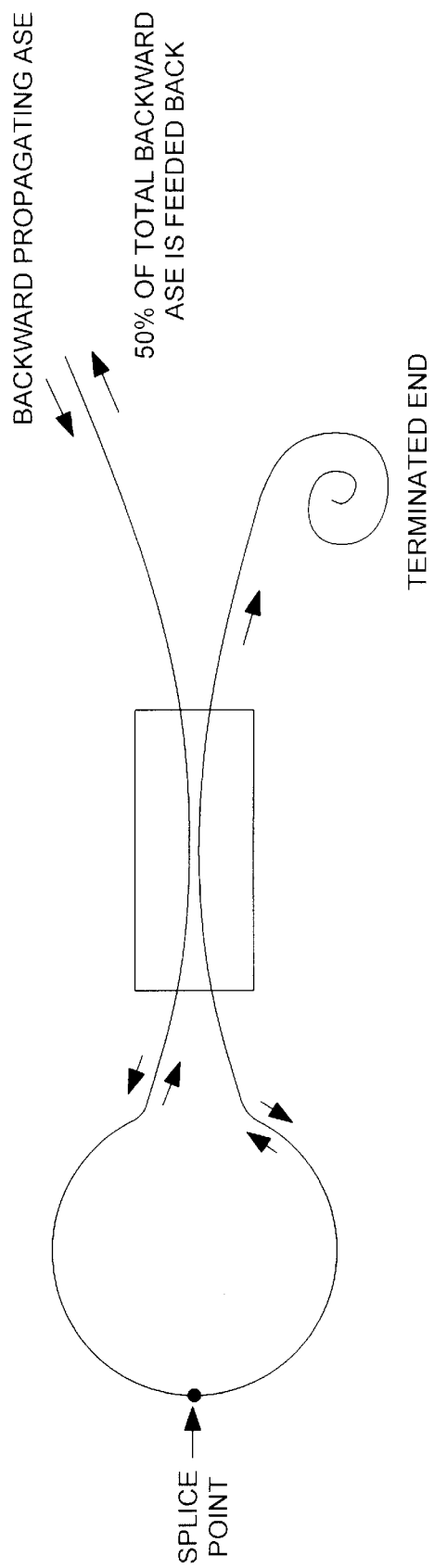
FIG. 4 shows an apparatus for feeding back the backward propagating ASE by a 50% bi-directional coupler.

With no spectrum correction, the natural ASE spectrum of an erbium doped fiber amplifier is illustrated in FIG. 2. The power density difference may vary depending on the actual amplifier structure, particularly the erbium fiber length compared to total pumping power.

A person understanding this invention may now conceive of alternative structures and embodiments or variations of the above. All those which fall within the scope of the claims appended hereto are considered to be part of the present invention.

I claim:

1. A broadband optical source comprising:
   (a) a first stage amplifier for producing an amplified spontaneous emission (ASE) optical seed signal having a forward propagating signal and a backward propagating optical signal,
   (b) feedback means for feeding back said backward propagating signal to the first stage amplifier to generate a forward propagating broadband optical signal,
   (c) a filter for receiving the broadband optical signal, the filter having a transfer characteristic inverse to at least a portion of the broadband optical signal, to equalize the level of the broadband optical signal, and
   (d) a second stage amplifier for amplifying the equalized broadband optical signal, and
   (e) means for outputting the equalized broadband optical signal.

2. A broadband optical source as defined in claim 1 in which the filter is a Bragg grating.

3. A broadband optical source as defined in claim 2 in which the feedback means is comprised of an optical coupler for receiving the backward propagating optical signal and for coupling a portion thereof back in a forward direction toward the first stage amplifier.

4. A broadband optical source as defined in claim 3 in which the optical coupler is a 50% coupler for coupling about 50% of the backward propagating optical signal back toward the first stage amplifier.

5. A broadband optical source as defined in claim 4 in which the optical coupler is a bidirectional coupler for receiving the backward propagating optical signal at one input, means for coupling an output optical signal from the bidirectional coupler to another input of the bidirectional optical coupler, and means for terminating another output of the bidirectional optical coupler.

6. A broadband optical source as defined in claim 3 further including an isolator connected between the output of the first stage amplifier and the input of the Bragg grating.

7. A broadband optical source as defined in claim 6 including an optical pump signal source, a first multiplexer for coupling a first portion of the pump signal to the input of the first stage amplifier, and a second multiplexer for coupling a second portion of the pump signal which is larger than the first portion to the second stage amplifier to generate an amplified optical signal having wide bandwidth.

8. A broadband optical source as defined in claim 7 including an optical splitter for receiving an optical pump signal and for splitting the optical pump signal into said first and second portions thereof.

9. A broadband optical source as defined in claim 8 in which said first portion is about 30% of the optical pump signal and in which said second portion is about 70% of the optical pump signal.

10. A broadband optical source as defined in claim 9 in which the feedback means is comprised of an optical coupler for receiving the backward propagating optical signal and for coupling a portion thereof back in a forward direction toward the first stage amplifier.

11. A broadband optical source as defined in claim 8 in which the optical coupler is a bidirectional coupler for receiving the backward propagating optical signal at one input, means for coupling an output optical signal from the bidirectional coupler to another input of the bidirectional optical coupler, and means for terminating another output of the bidirectional optical coupler.

12. A broadband optical source as defined in claim 11 in which the optical coupler is a 50% coupler for coupling about 50% of the backward propagating optical signal back toward the first stage amplifier.

13. A broadband optical source as defined in claim 3 in which the amplifier is formed of erbium doped optical fiber.

14. A broadband optical source as defined in claim 7 in which the amplifiers are formed of erbium doped optical fiber, and the multiplexers are wave division multiplexers of 980 and 1550 nm.

15. A broadband optical source as defined in claim 14 in which the isolator has a peak isolation of about 1530 nm.

16. A method of producing a broadband optical signal comprising:
   (a) pumping a first stage amplifier with an optical pumping signal, to produce an amplified spontaneous emission (ASE) seed signal having a forward propagating optical signal and a backward propagating optical signal,
   (b) feeding back the backward propagating optical signal to the first stage amplifier to generate a forward propagating broadband optical signal,
   (c) passing the broadband signal through a filter having a transfer characteristic which is the inverse of to at least a portion of the broadband optical signal to flatten the broadband signal, and
   (d) amplifying and outputting the flattened broadband signal.

17. A method of producing a broadband optical signal comprising generating an amplified spontaneous emission (ASE) signal in an optical amplifier having forward propagating and backward propagating portions thereof, feeding back the backward propagating portion to the optical amplifier to generate a forward propagating broadband optical signal, and outputting the broadband optical signal from the optical amplifier.

18. A method as defined in claim 17, including passing the broadband optical signal through a Bragg grating having a transfer characteristic which is substantially the inverse of a peak in the broadband optical signal, whereby an output optical signal thereof has a constant level within a broad bandwidth.

19. A method as defined in claim 18, including using an erbium doped optical fiber for the amplifier, the Bragg grating having a peak negative transfer characteristic at about 1530 nm.

* * * * *

UNITED STATES PATENT AND TRADEMARK OFFICE
CERTIFICATE OF CORRECTION

PATENT NO.   : 6,172,995 B1
DATED        : January 9, 2001
INVENTOR(S)  : Yang

It is certified that error appears in the above-identified patent and that said Letters Patent is hereby corrected as shown below:

<u>Column 3,</u>
Line 49, after "27" insert -- via --

Signed and Sealed this

Seventeenth Day of September, 2002

Attest:

Attesting Officer

JAMES E. ROGAN
*Director of the United States Patent and Trademark Office*